(12) United States Patent
Hündgen et al.

(10) Patent No.: US 11,524,351 B2
(45) Date of Patent: Dec. 13, 2022

(54) MULTISTAGE JOINING PROCESS WITH THERMAL SPRAYED LAYERS

(71) Applicant: Outokumpu Oyj, Helsinki (FI)

(72) Inventors: Thomas Hündgen, Juechen (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 276 days.

(21) Appl. No.: 16/955,865

(22) PCT Filed: Dec. 19, 2018

(86) PCT No.: PCT/EP2018/000565
§ 371 (c)(1),
(2) Date: Jun. 19, 2020

(87) PCT Pub. No.: WO2019/149336
PCT Pub. Date: Aug. 8, 2019

(65) Prior Publication Data
US 2021/0069819 A1    Mar. 11, 2021

(30) Foreign Application Priority Data

Dec. 21, 2017 (EP) .................................... 17209825

(51) Int. Cl.
| | |
|---|---|
| *B23K 3/04* | (2006.01) |
| *B23K 3/047* | (2006.01) |
| *B23K 26/323* | (2014.01) |
| *B23K 11/06* | (2006.01) |
| *B23K 11/16* | (2006.01) |
| *B32B 15/01* | (2006.01) |
| *C23C 4/02* | (2006.01) |
| *C23C 4/08* | (2016.01) |
| *C23C 4/10* | (2016.01) |

(Continued)

(52) U.S. Cl.
CPC ............ *B23K 3/0478* (2013.01); *B23K 11/06* (2013.01); *B23K 11/10* (2013.01); *B23K 11/11* (2013.01); *B23K 11/14* (2013.01); *B23K 11/163* (2013.01); *B23K 11/20* (2013.01); *B23K 26/323* (2015.10); *B32B 15/012* (2013.01); *C23C 4/02* (2013.01); *C23C 4/06* (2013.01); *C23C 4/08* (2013.01); *C23C 4/10* (2013.01); *C23C 4/18* (2013.01); *B23K 2103/04* (2018.08); *B23K 2103/20* (2018.08)

(58) Field of Classification Search
None
See application file for complete search history.

(56) References Cited

FOREIGN PATENT DOCUMENTS

| | | |
|---|---|---|
| JP | H04 251676 A | 9/1992 |
| WO | 00/38854 A1 | 7/2000 |

OTHER PUBLICATIONS

Oikawa, H. et al., "New resistance welding techniques for steel and aluminium," Welding International, Taylor & Francis, vol. 7, Issue No. 10, Jan. 1, 1993, pp. 820-827.

(Continued)

*Primary Examiner* — Daniel J. Schleis
(74) *Attorney, Agent, or Firm* — Quinn IP Law

(57) ABSTRACT

Method for joining of at least two unweldable materials, non-weldable directly to each other with thermal joining processes in a lap joint configuration, where a two step sequence is used consisting of a first step to apply a thermomechanical or mechanical surface protection layer on the surface of an unweldable material and a second step, where a thermal joining process is used to joint the sprayed layer with an applied layer sheet.

19 Claims, 2 Drawing Sheets

Figure 1:
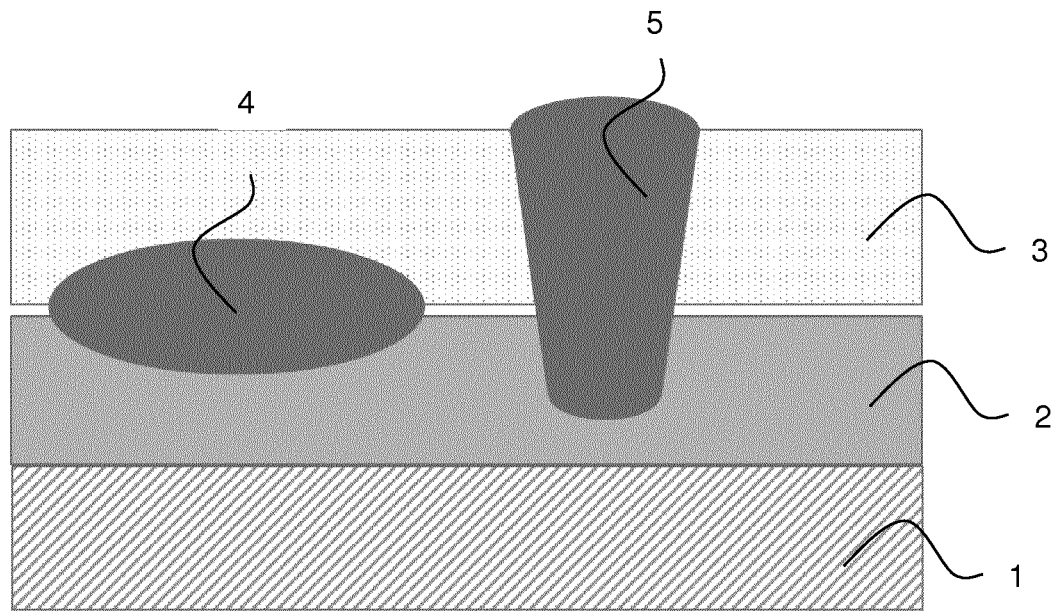

(51) Int. Cl.
*B23K 11/11* (2006.01)
*B23K 11/20* (2006.01)
*C23C 4/06* (2016.01)
*C23C 4/18* (2006.01)
*B23K 11/10* (2006.01)
*B23K 11/14* (2006.01)
*B23K 103/20* (2006.01)
*B23K 103/04* (2006.01)

(56) References Cited

OTHER PUBLICATIONS

Sun, X. et al., "Resistance Spot Welding of Aluminum Alloy to Steel with Transition Material—From Process to Performance—Part I: Experimental Study," Welding Journal, American Welding Society, vol. 83, Issue No. 6, Jun. 1, 2004, pp. 188S-195S.
International Search Report of the International Searching Authority for PCT/EP2018/000565 dated Jun. 6, 2019.

MULTISTAGE JOINING PROCESS WITH THERMAL SPRAYED LAYERS

The present invention works with all state-of-the-art unweldable material combinations. An unweldable material combination is defined in this case as a dissimilar material combination of at least two sheets arranged in a lap joint configuration whereby at least one of the materials must be a metallic material. A metallic thermal sprayed layer is applied on the surface of the non-weldable material, here the non-metallic material or the metallic material showing weld defects, with a well-defined thickness, surface roughness and transition resistance. Then in a second step the welding process follows whereby only the contact area between the thermal sprayed metallic layer and the metallic material is welded together.

In every field of material engineering the problem is how to use different materials in multi-material design with dissimilar joints. State of the art there is no thermal welding method available, only bonding and mechanical joining can be used. With the invention the cheap and fast-cycle-time resistance spot welding can be used.

Some of those state of the art non-weldable dissimilar material combinations and the way how to weld them with the present invention are pointed out in the following.

The EP17157773.7 patent application relates to a method for joining of at least two materials, non-weldable directly to each other with thermal joining processes in a lap joint configuration, where a two step sequence is used consisting of a first step to apply a thermomechanical or mechanical surface protection layer on the surface of a (stainless) steel substrate and a second step where, a thermal joining process is used to weld the sprayed layer with an applied aluminum sheet without having brittle intermetallic phases in the whole material configuration.

The DE patent applications 102004025493 and 102004025492 relates to a method for joining components, a joining element and a component for joining components. Two or more joining parts, particularly metal sheets and/or sheets of plastic by means of joining elements are joined together. When joining the elements it can serve rivets or bolts. The components to be joined are provided with openings, in particular provided bores into which the joining elements can be inserted. The parts to be positioned to each other and then joined by soldering of the joining elements. Advantageously it can be used as a conventional welding or a conventional welding gun, but where is the required heat input due to the soldering significantly lower compared to welding.

With the present invention it makes possible to weld metals with glass or acrylic glass for example in architecture or design applications. To achieve this kind of a metallic thermal sprayed layer, it must be applied on the later contact surface side of the glass. Ideally, but not necessarily the thermal sprayed layer has a similar or nearly similar alloy related to the metallic material. Then in a second step, the metallic material can be welded with the glass applied on metallic thermal sprayed layer in a lap joint configuration with an arc or beam welding process. A resistance welding process is not possible because the glass works as an isolating material.

The same kind of feature, which is consisting of series of steps as described above works also successfully when welding a metallic material with wood, plastic or fibre composites like glass fibre, carbon fibre, aramid fibre, ceramic fibre, natural fibre or steel fibre. The metallic thermal sprayed layer must be applied on the surface of the plastic or fibre composite (matrix material) in a way that a contact temperature of the spraying elements and the non-metallic surface is lower than short-termed 250° C., more preferably lower than 190° C. Another preferably design example is to weld steel/polymer composite structures, so called sandwich structures, with metallic materials. Usually the core thickness of the polymer or plastic material is much thicker than the thin metallic outer layers. Therefore during arc or laser welding process in a lap joint configuration, the destroyed microstructure problem exists, that the structure, and because of that phenomena, the properties of the polymer will be destroyed. With the process steps of the present invention, it is possible to add first a metallic thermal sprayed layer on the metal outer layer of the sandwich structure, which will work during the following actual welding process as a thermal buffer, so that the polymer core material not will be overheated above the critical value.

With the present invention it is not only possible to create a kind of weldability of multistage joining process with thermal sprayed layers for combinations with a metallic material joined with a non-metallic material. Also state of the art problems for welding metallic materials can be solved, where a specific temperature range must be avoided not to change the microstructure in a negative manner of the destination source. Some of these features are pointed out below.

It is possible to avoid hot cracks in materials which are susceptible to hot cracking like austenitic nickel alloyed stainless steels or nickel base alloys. Hot cracks are defined as material segregations which occurs at high temperatures (above 1050° C.) if the size of strain and strain rates exceed a specific threshold. With applying a metallic thermal sprayed layer on the surface (in welding contact direction) of the endangered material, it is possible to influence the resulting strain and stresses (also the distortion) in the area of the endangered material as well as to lower the local temperature in this area. The thermal sprayed layer must be a dissimilar alloy which is not susceptible to hot cracking like manganese alloyed austenites or a chromium alloyed ferritic steel. The endangered metal is not welded directly with the joining partner. The join takes place only between the thermal sprayed layer and the joining partner. The material/sheet endangered for hot cracks only acts as heat affected zone with a temperature under 1000° C. This works with all welding procedures in a lap joint configuration.

A liquid metal embrittlement is a problem, where a liquid metal penetrates with a solid metal and therefore intergranular cracks occur. This problem is well known in the literature for material combinations like aluminum with gallium, hot-formable zinc coated steels, stainless steels, austenitic steels or multiphase steels welded together with zinc coated materials or brazing materials. If an uncritical metallic alloy is thermal sprayed as a layer on the surface of the endangered solid metal, zinc or braze can not penetrate the surface and grain boundaries of the solid metal as a liquid metal during welding or brazing. This process works for all welding processes like arc, beam or resistance welding and brazing in a lap joint configuration. For automotive structural applications it can be further combinated with hybrid joining processes.

Hybrid joining processes are characterized by the usage of at least two joining procedures in a consecutively or concurrent way. Such a hybrid joining process is the Weldbonding where at first a bonding is created by applying a not-cured adhesive between two sheets in lap joint configuration. Then in a second step a resistance spot welding is executed and added a material-locked connection beside the existing adhesive connection. Another type of a hybrid joining process is the combination of bonding with mechanical joining like clinching, riveting or tack-setting. Also two thermal joining processes could be combined as a hybrid joining process: Laser beam welding in combination with a GMAW process is then called "GMAW-laser-hybrid". An uncritical metal alloy is for example a one-phase ferritic chromium alloyed stainless steel which is applied as a thermal sprayed layer on an austenitic stainless steel before conventional welded together with zinc-coated carbon steels.

With the method of the present invention it is also possible to influence the grain growth in the heat affected zone of fragile metals like a ferritic stabilized (Ti, Nb) stainless steel in a positive way. Usually the temperature in the heat affected zone of the base materials during fusion welding results in a grain growth. Because of the fact that the coarser grain lead to a higher hardenability, the hardness of the heat affected zone significantly increases and shows brittleness, rapid failure, lower power transmission and lower fatigue properties.

With applying a non-dangered metal alloy by thermal spraying on the surface of such an endangered metal, a lower hardness increase up to completely avoiding of a hardness increase, depending on the thermal sprayed layer thickness results. Such a less fragile metal layer could be an austenitic stainless steel.

For stainless steels which are not stabilized or not defined as ELC (Extra Low Carbon) and therefore susceptible for intergranular corrosion (IC), it is possible with the present invention to avoid IC using a thermal sprayed layer. With a stabilized layer it is possible to descend the temperature under 350° C. in the IC endangered base material which is not directly welded with the joining partner. As a result the critical $M_{23}C_6$ segregations can not be formed in a critical manner because the necessary critical starting temperature and time will fall below. Not stabilized chromium allyod steels like 1.4016 are there fore weldable. A solution annealing above 1000° C. with following water quenching as a post-treatment is no longer necessary. Further the thermal sprayed layer works like a barrier for corrosion medium. This principle can be also used to avoid stress corrosion cracking in a way that the necessary corrosion medium can not attack the base material in the stressed area, e.g. because of a weld seam, because of the thermal sprayed layer.

With the method of the present invention it is further possible to avoid the cold crack endangerment of hardenable high carbon alloyed, martensitic steels and stainless steels having a carbon content of more than 0.2% C. With the thermal sprayed layer the hardenable base material is only influenced as a low temperature heat affected zone with T<700° C. Also delayed hydrogen-affected cold cracks can be avoided. In the same way it is possible to undercut the 475° C. embrittlement of Duplex stainless steels.

Summing up with the method of the present invention it is possible to avoid in a lap joint configuration the different endangerments the diagram of Schaeffler pointed out.

With the method of the present invention it is further possible to avoid weld seam irregularities or inner defects in a lap joint configuration like porosity, (shrinkage) cavities, lack of fusion or metallurgical caused microcracks, too. One example is the endangerment of magnesium for porosity during welding for aerospace applications. By using another metallic alloy or braze material the lap joint can be executed without undesired porosity. Another possibility to qualify lap joints for aerospace applications is welding of titanium with active gases. State of the art, embrittlement of titanium will follow after contacting with an active gas ($CO_2$, $O_2$) during welding. Having a thermal sprayed layer on the titanium base material manufactured with a non-titanium metal or braze material will solve this problem.

A further benefit can be mentioned for corrosion stressed applications in a lap joint configuration with dissimilar materials, especially if their electrochemical potential difference is very high, e.g. stainless steels in combination with aluminum for chassis car applications in a wet corrosion environment. Stainless as a significant more noble material (>0.8V difference in standard potential value E0) will misuse aluminum as a sacrificial anode. This corrosion mechaims is known as contact corrosion, galvanic corrosion or rather bimetallic corrosion. In the case of a gap during a lap joint configuration crevice corrosion further supports the negative effect because of an increased concentration with ions, e.g. chlorides, and a lower oxygen concentration. Having similar material surrounding the whole gap will significantly reduce the corrosion effect. In the described case a stainless alloy can be applied as a thermal sprayed layer on the aluminum sheet to have only stainless alloy surrounding the gap. Further the more ignobly material should have the bigger area to slow down contact corrosion effects. Therefore it make sense to combine a thinner thermal sprayed stainless alloy on the surface of a bigger aluminum sheet.

Moreover it is of course possible to use the method of the present invention to improve a weld seam or a weld nugget quality of established and working welded applications by a targeted alloying of the seam or nugget with the right selected thermal sprayed layer. Some examples are given for the resistance spot welding for automotive constructions. Three-sheet combinations are well-established but challenging for this application. This is due the physical properties for example a thermal conduction, which is critical to join all three sheets in a meaning of the existence of two connection levels and especially if the first sheet is a thicker austenitic steel, the middle sheet is a ferritic one and the third one is also a ferritic steel but very thin for outer-skin usage. Because of the thickness ratio of the three sheets and the circumstance that the austenitic steel will protect the heat, it is only partially possible to connect the third sheet in very thin and ferritic configuration before welding the splatters arise in the austenitic nugget area. Now with the present invention it is possible to apply an austenitic stainless CrNi-alloyed layer on a thin low-alloyed ferritic steel and therefore to relocate the weld nugget also in the area of the formally two ferritic steels is shown in FIG. 1.

Summing up, the method of the present invention with the two step sequence has the generally target to fall below a critical temperature for the therefore unweldable material. By making this target available the thermal sprayed layer or rather the distance from weld end within the thermal sprayed layer to the contact area of the thermal sprayed layer with the unweldable material, called layer distance I, works like a heat-reducing factor to undercut the specific critical temperature. Thereby the critical temperature is defined as described in the paragraphs before as a material related value where the weldability is not existing. To design the right layer distance I, it can be calculated by using the formula (1)

$$I=(A*\lambda*\Delta T)/Q \qquad (1).$$

Thereby $\lambda$ is the thermal conductivity of the thermal sprayed layer [W/(m*K)], Q is the heat flow introduced by welding as the second step [W] and A is the weld area [mm²]. For seam weld processes it can be defined by formula (2)

$$A = W * L \quad (2)$$

whereby W is the weld width [mm] and L is the length of the seam [mm]. For spot-shaped welding processes like the resistance spot welding, A can be calculated by formula (3)

$$A = Pi * r^2 \quad (3)$$

whereby r is the radius [mm].

Within formula (1), $\Delta T$ is defined more the method of the present invention by formula (4)

$$\Delta T = T_{melt} - T_{failure} \quad (4)$$

Whereby $T_{melt}$ is the melting point temperature of the melt pool during welding [K] and $T_{failure}$ is the critical temperature of the unweldable substrate material at which welding failures are initiated. Therefore the calculated distance I must be bigger or equal to the critical distance $I_C$:

$$I \geq I_C \quad (5)$$

The heat flow can be calculated for seam welding processes with the "energy per unit length of weld" E multiplied with the thermal efficiency $\eta$:

$$Q = E * \eta = (U * I * \eta)/v \quad (6)$$

whereby U is the welding voltage [V], I is the welding current [A] and v the used welding speed [mm/min].

For a resistance spot welding process the formula (7) can be used $$Q = Q_I - Q_L = (I^2 * R * \Delta t) - (Q_{LC} + Q_{LS} + Q_{LR}) \quad (7)$$

whereby $Q_A$ is the introduced heat quantity defined by the welding current I [A], the sum of electrical resistances R [$\mu\Omega$] and the welding time $\Delta t$ [ms], and $Q_L$ the heat losses defined by losses because of copper electrodes $Q_{LC}$, sheets $Q_{LS}$ and radiation losses $Q_{LR}$.

Figure 2:
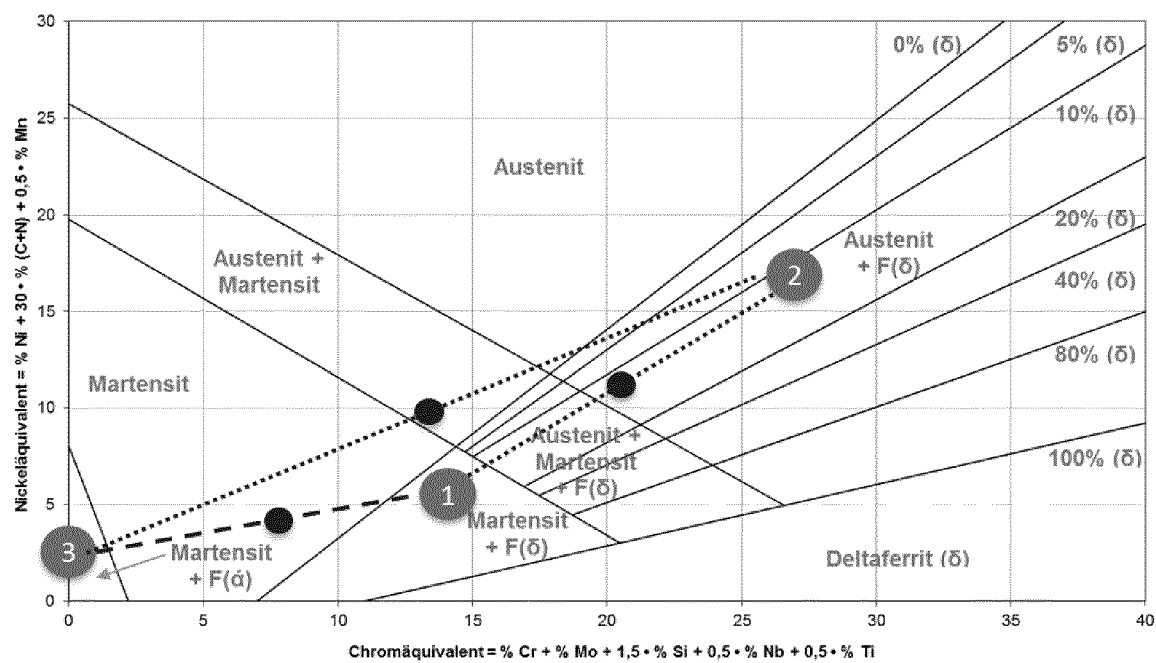
Figure 3:
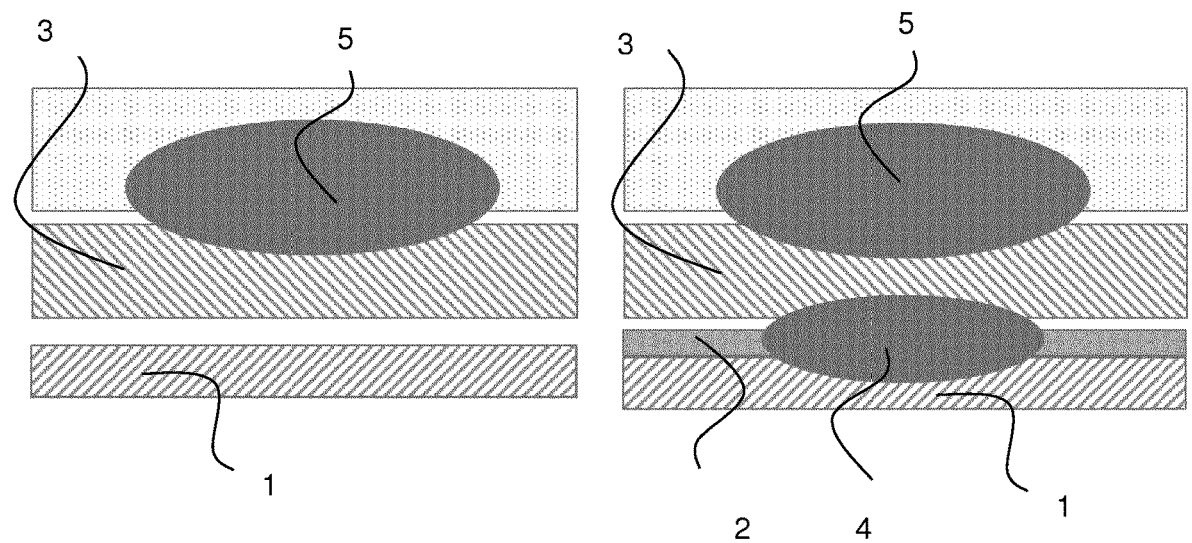
Figure 4:
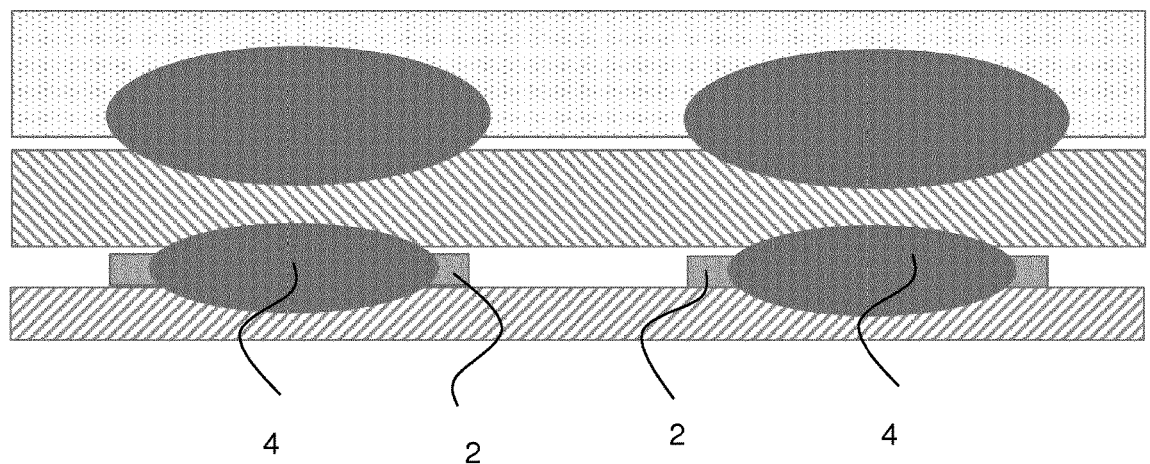

The invention is described in details in the following referring to the drawings, wherein FIG. 1 illustrates as described in the prior art of the invention where state of the art is located on the left side and the method of the present invention is illustrated on the right side, FIG. 2 illustrates as described in the prior art of the invention a relation of the diagram of Schaeffler provides information on the welding properties of the various types of microstructure, FIG. 3 shows the influencing parameters, FIG. 4 illustrates another preferred embodiment of the resistance spot welded thermal sprayed aluminum layer with an aluminum flat sheet of the invention schematically from the side view, where the welded thermal sprayed layer/stainless steel with another aluminum flat sheet is shown.

Of course the method of the present invention can be used also for two-sheet combination and to improve their quasi-static as well as dynamic or ballistic power transmission under different directions of load and especially the fatigue as well as the fracture behavior can be significantly improved. Again the example of an austenitic thermal sprayed layer on a ferritic (or multiphase with ferritic) steel which should be welded by resistance spot welding with another low-alloyed steel. Because of the austenitic thermal sprayed layer the resulting weld nugget will also austenitic influenced with the result of a more ductile fracture behavior like plug fractures with a lower hardness and a higher level during fatigue. In general with the diagram according to Schaeffler it is possible to influence the resulting seam or nugget by using a thermal sprayed layer in a suitable way for the requirements of the application. In FIG. 2 the diagram of Schaeffler provides information on the welding properties of the various types of microstructure, thus as a function of what alloying elements they contain. The Schaeffler diagram is also classified with welding problems, having different areas for hot cracking, cold cracking, grain growth and embrittlement. In FIG. 2 illustrates such a configuration state of the art and with the method of the present invention.

Further, the materials also used in the method of the present invention are the steels having the carbon equivalent (CEV) more than 0.65%, where CEV is calculated using by a formula (8) (element contents by weight %):

$$CEV = C + Mn/6 + (Cu+Ni)/15 + (Cr+Mo+V)/5. \quad (8)$$

With a thermal sprayed layer characterized by a low carbon (LC, C≤0.25%) or more preferably extra low carbon content (ELC, C≤0.03%) and a ductile austenitic alloy, it is possible to avoid a critical hardness increase of more than 50 HV compared to the base material, embrittlement, cold cracks and a critical fracture behaviour.

For metallic with non-metallic (glass, wood) combinations screw or bolted connections possible as well as bonding, but no thermal joining.

For metallic-metallic combinations: also bonding, mechanical joining in general (riveting, clinching), for some metals (aluminium, magnesium) friction stir welding but only in butt joint configuration.

Conversely, if the used/established welding method is not possible with the material the material is not in usage. One example: Our press-hardenable martensitic grades like 1.4034 which can be hardened above 1850 MPa suitable for structural car body parts but not weldable. Therefore 1.4034 is not in use at the OEMs.

The idea of the present invention is to make unweldable material combinations like nonmetallic (glass, wood, carbon fiber, plastic) or metallic (Copper, Magnesium, Titanium) to (stainless) steel or general unweldable materials like high-carbon alloyed (stainless) steels weldable by applying a thermal sprayed layer on the surface of the unweldable material with a well-defined thickness, surface roughness and transition resistance. Then in a second step the resistance, arc or beam welding process follows. The used welding parameters must be selected in a way that only the contact area between the thermal sprayed layer to the weldable material melts without having unavoided welding-affected phenomena in the unweldable material.

Layer thickness typical for spot welds is greater than or equal to 15 µm. The FIG. 1 shows the influencing parameters: The unweldable material (1) has a specific material/alloy depending critical temperature $T_C$ which shall not be exceeded. Then (1) is applied with a thermal sprayed layer (2) whereby (2) has a specific, for the respective material combination and application suitable thermal conductivity $\lambda_2$ which influence the heat transfer from the weld seam/nugget to the unweldable base material (1). Now a welding method (4) or (5) is used to weld (1)+(2) with the second material, here called weldable material (3) whereby the weld seam/nugget is only located in (3) and (2) and their contact surface/area and not in (3). The respective welding method introduce a specific welding temperature $T_W$ into the material combination. As a result the weld seam/nugget has a defined distance between (4)/(5) and (1) which is called tw.

With this information the following relationship can be defined whereby $T_{actual}$ is the temperature which is introduced with the present invention into (1):

$$T_C \geq T_{actual}(TW, tW, \lambda_2) \quad (9)$$

The substrate surface (1) can be pretreated in accordance with the present invention by cleaning or degreasing, and blasting or peening. In that case the blasting abrasive for blasting or peening can consists also of corundum, steel wire, silicium carbide, and hard cast gravel or glass bead. FIG. 4 shows the layers in a case of three layers with a different thickness.

The thermomechanical coating method regarding to this invention can consist of flame spraying, arc spraying, plasma spraying, laser spraying, cold gas spraying, detonation spraying, high velocity oxygen fuel spraying or molten pool spraying. In the process of the spray material or spraying consumable is supplied as a wire, rod, bar, cord, powder or as a molten pool.

The invention is described in more details in the following referring to the drawings, wherein FIG. 1 illustrates one preferred embodiment of the two step sequence schematically from the side view where a thermomechanical or mechanical surface protection layer (2) is applied on the surface of an unweldable material (1) during the first step. With a following second step, a thermal joining process is used to join the sprayed layer (2) with an applied layer sheet (3) as a weld nugget or seam (4) using the method of resistance welding or a weld seam (5) using the method of beam welding (5). As an example the ratio of the thermal sprayed layer (2) thickness to the reached by spot weld (4) diameter is lower or equal to 0.25.

FIG. 2 illustrates the diagram of Schaeffler as a theoretical background for the relationship of austenite and ferrite formers for alloyed steels. The numbers inside the balls stand for the position of the used unweldable material (1), the thermomechanical or mechanical surface protection layer (2) and the applied layer sheet (3) for one specific example. The dotted lines pointed out the relationship between them whereby the black balls showing the resulting weld configuration. It can be shown that with having a thermomechanical or mechanical surface protection layer (2), the resulting welds to the unweldable material (1) and the applied layer sheet (3) are now in an critical area of the diagram of Schaeffler.

FIG. 3 illustrates another preferred embodiment of the two step sequence (right picture of FIG. 3) in comparison to a state of the art process (left picture inside FIG. 3) schematically from the side view for a non-weldable threet-sheet configuration with the method of resistance spot-welding. For so-called black-white combinations where a thin ferritic steel sheet, e.g. as an outer-skin part, must be applied with another thicker sheet in the middle and the thickest sheet with an austenitic microstructure on the other outer side, it is state-of-the art not possible to join the thin ferritic sheet to the others because of the different physical properties (left side). In this embodiment the thin ferritic sheet is the unweldable material (1). With the first step of the two step sequence of the present invention a thermomechanical or mechanical surface protection layer (2) is applied on the surface of an unweldable material (1). The second step is in this case represented by the traditional resistance spot-welding. During this second step it is now possible to join also the middle sheet which represents in this case the applied layer sheet (3) to the sprayed layer (2) by having a weld nugget (4) between tem. The weld nugget (5) between the upper thick austenitic sheet and the middle sheet will be performed as usual. As an example of the total sheet thickness including substrate (1), thermal sprayed layer (2), applied sheet (3) can reach the values between 1.5 mm up to 6.0 mm.

FIG. 4 illustrates another preferred embodiment of the two step sequence schematically from the side view whereby the thermomechanical or mechanical surface protection layer (2) is used just for the areas where a following resistance spot weld (4) is applied during the second step of the two-step sequence. This located using of a thermomechanical or mechanical surface protection layer (2) increases the economic efficiency on the one side, and on the other side the protection layer (2) increases the resistance against crevice corrosion inside the gap of the lap joint configuration. As an example the thickness of the thermal sprayed layer (2) can have the values from 0.25 mm up to 1.5 mm.

The invention claimed is:

1. A method for joining of at least two materials that are non-weldable directly to each other with thermal joining processes in a lap joint configuration, the method consisting of:
   in a first step, applying a surface protection layer on a surface of a substrate material; and
   in a second step, using a thermal joining process to join the surface protection layer with an applied layer sheet by forming a weld nugget therebetween; and
   wherein a ratio of a thickness of the surface protection layer to a reached weld diameter of the weld nugget is equal to or lower than 0.25.

2. The method according to the claim 1, further comprising:
   applying the surface protection layer by a thermal spraying method.

3. The method according to claim 1, wherein the surface protection layer is made of a metal based alloy or a combination of metal with carbides.

4. The method according to claim 1, wherein the thermal joining process is a resistance welding method.

5. The method according to claim 1, wherein a total sheet thickness including the substrate material, the surface protection layer, and the applied layer sheet, is between 1.5 mm up to 6.0 mm.

6. The method according to claim 1, wherein a thickness of the surface protection layer is from 0.25 mm up to 1.5 mm.

7. The method according to claim 1, wherein the substrate surface is pretreated by cleaning and blasting.

8. The method according to claim 1, wherein:
   the applied layer sheet is made of a metallic material; and
   the surface protection layer is made of an alloy related to the metallic material.

9. The method according to claim 1, wherein the thermal joining process is a hybrid joining process combining bonding with mechanical joining.

10. The method according to claim 1, wherein the surface protection layer is operable as a barrier for corrosion medium.

11. The method of claim 1, wherein the substrate material is a metallic layer.

12. The method of claim 1, wherein:
    the substrate material is one of a stainless steel or a high-carbon alloyed steel; and
    the applied layer sheet is one of a copper, magnesium, or titanium material.

13. The method of claim 1, wherein:
    the substrate material is a stainless steel alloy;
    the surface protection layer is a thermal sprayed aluminum; and
    the applied layer sheet is an aluminum material.

14. The method of claim 1, wherein
    the substrate material is a ferritic steel;

the surface protection layer is a low carbon austenitic alloy; and the applied layer sheet is a low alloy steel.

15. The method of claim 1, wherein the substrate material is a non-metallic material.

16. The method of claim 15, wherein the non-metallic material includes at least one of a glass, wood, carbon fiber, or plastic material.

17. The method of claim 15, wherein a contact temperature of the surface protection layer in contact with the substrate material is lower than 250° C.

18. The method of claim 4, wherein the resistance welding method includes at least one of weldbonding, spot welding, projection welding or roller seam welding.

19. Use of at least two materials that are non-weldable directly to each other with thermal joining processes in a lap joint configuration, wherein in a two step sequence:

in a first step, a surface protection layer is applied on a surface of a substrate material; and in a second step, a thermal joining process is used to join the surface protection layer with an applied layer sheet by forming a weld nugget therebetween; and wherein a ratio of a thickness of the surface protection layer to a reached weld diameter of the weld nugget is equal to or lower than 0.25.

\* \* \* \* \*